(12) United States Patent
Kromann

(10) Patent No.: US 6,766,313 B1
(45) Date of Patent: Jul. 20, 2004

(54) SYSTEM AND METHOD FOR CACHING AND RETRIEVING INFORMATION

(75) Inventor: Paul K. Kromann, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 274 days.

(21) Appl. No.: 09/614,435

(22) Filed: Jul. 12, 2000

(51) Int. Cl.[7] ............................................... G06F 17/30
(52) U.S. Cl. ........................... 707/2; 711/118; 711/126
(58) Field of Search ........................ 707/10, 102, 1–5; 345/151, 152; 711/118, 126

(56) References Cited

U.S. PATENT DOCUMENTS

| | | | | |
|---|---|---|---|---|
| 6,029,175 A | * | 2/2000 | Chow et al. ................... | 707/10 |
| 6,098,064 A | * | 8/2000 | Pirolli et al. .................... | 707/2 |
| 6,167,490 A | * | 12/2000 | Levy et al. ................... | 711/148 |
| 6,243,719 B1 | * | 6/2001 | Ikuta et al. ................... | 707/203 |
| 6,249,804 B1 | * | 6/2001 | Lam ........................... | 709/203 |
| 6,272,507 B1 | * | 8/2001 | Pirolli et al. .................... | 707/5 |
| 6,330,561 B1 | * | 12/2001 | Cohen et al. ................. | 707/10 |
| 6,349,326 B1 | * | 2/2002 | Lam ........................... | 709/203 |
| 6,369,840 B1 | * | 4/2002 | Barnett et al. ............... | 345/751 |
| 6,415,368 B1 | * | 7/2002 | Glance et al. ............... | 711/151 |
| 6,658,462 B1 | * | 12/2003 | Dutta ......................... | 709/219 |
| 2002/0120685 A1 | * | 8/2002 | Srivastava et al. .......... | 709/203 |

* cited by examiner

*Primary Examiner*—Uyen Le
*Assistant Examiner*—Hanh Thai
(74) *Attorney, Agent, or Firm*—Woodcock Washburn LLP

(57) ABSTRACT

A system for caching and retrieving information comprises a server having an information repository, a cache manager, and a server software module. The information repository receives and stores data that is to be served by the server, where such data is regularly updated from at least one external source. The server software module performs server functions including responding to at least some requests for a document from a requestor by retrieving data currently stored in the repository, rendering the document to include the retrieved data, and forwarding the rendered document to the requestor. The cache manager requests a document from the server software module, receives the requested document as rendered by the server software module to include the retrieved data currently stored in the repository, and caches the received document on a regular basis.

32 Claims, 4 Drawing Sheets

SYSTEM AND METHOD FOR CACHING AND RETRIEVING INFORMATION

TECHNICAL FIELD

The present invention relates to a system and method for caching and retrieving information such as Internet data, More specifically, the present invention relates to such a system and method for increasing system efficiency by periodically caching frequently requested information such that the information need not be reconstructed in response to each request therefor.

BACKGROUND OF THE INVENTION

A system that delivers electronic information to a requester upon request therefrom is known. As but one example, an Internet content provider delivers Internet information to an Internet user upon request therefrom—that is, when the user 'visits the site' of such content provider. Such Internet content providers are, of course, ubiquitous in this day and age. In such an Internet system, in particular, a requester has a computing device and an appropriate Internet connection with the content provider, and thus sends an HTTP request for the information to the content provider at an Internet web site. The provider responds to the HTTP request by constructing an HTML web page having the requested information and returning such HTML page to the requester. Such HTML page may of course then be rendered by way of an appropriate browsing device on the computing device of the requester.

Types of content providers that provide such information are many and varied. In one type of particular interest, the content provider presents a page of general information to the user. For example, a user visiting a site such as www.msn.com—the MICROSOFT NETWORK home web, an Internet-based product of MICROSOFT Corporation of Redmond, Wash.—is automatically presented with a variety of information including: news articles, a search engine, advertisers, weather information, sports information, map information, telephone directories, financial information, and/or the like; and/or links to news articles, a search engine, advertisers, weather information, sports information, map information, telephone directories, financial information, and/or the like.

Typically, such a site such as an Internet site is implemented by way of one or more servers appropriately coupled to the a network such as the Internet for responding to the aforementioned user requests. In particular, each server is provided with all information necessary to construct the requested page. Thus, in response to a particular request, the server does so construct the requested page with the provided information and then communicates the constructed page to the requesting user. Typically, the provided information is updated from external sources on a timely and/or regular basis, which may be on the order of every 15 seconds, every 15 minutes, or the like, depending on the type of information and other factors.

Importantly, because the provided information may have been updated since a previous request was serviced, the server preferably newly construct the page for each and every received request in order that the constructed page has the latest, newest, and/or most current information. As should be understood, the server typically constructs the page according to a pre-defined script.

Of course, if the page is served by the server many times before information therein is updated (for example, 10 times per second), the process becomes inefficient in that the exact same page is being constructed multiple times. Accordingly, a need exists for a system and method that caches such a page in a manner such that the process of page construction by the server is more efficient, while at the same time ensures that the information in the constructed and cached page is current.

As should be appreciated, in some situations the aforementioned server constructs different variations of the page depending on who the user is and/or what hardware and/or software the user is employing in connection with the computing device thereof, among other things. In one case, the user may have pre-defined information that is to appear in the constructed page, such predefined information for example being specified in a 'cookie' or the like sent with the page request. As an example, the user may have requested that the constructed page as provided by the server include local weather and stock quotes for particular stocks. In another case, the user may be employing a computing device having a particular browser, a particular processor, a particular graphics card, etc., such particulars for example being specified in a user agent string sent with the page request. While perhaps not absolutely necessary, such user agent string information may be employed by the server during page construction to customize the constructed page for rendering on the user's computer device.

Accordingly, in the aforementioned cases and perhaps others, the server constructing the page in response to a page request could conceivably construct many variations of the served page, with the result being that the relative efficiency is higher. Nevertheless, there are at least some variations of the served page that are constructed frequently enough to merit caching. Thus, a need exists for a system and method that caches multiple page variations in a manner such that the process of page construction by the server is more efficient, while at the same time ensures that the information in the constructed and cached pages are current.

SUMMARY OF THE INVENTION

In the present invention a system for caching and retrieving information comprises a server having an information repository, a cache manager, and a server software module. The information repository receives and stores data that is to be served by the server, where such data is regularly updated from at least one external source. The server software module performs server functions including responding to at least some requests for a document from a requestor by retrieving data currently stored in the repository, rendering the document to include the retrieved data, and forwarding the rendered document to the requestor. The cache manager requests a document from the server software module, receives the requested document as rendered by the server software module to include the retrieved data currently stored in the repository, and caches the received document on a regular basis. The cached document is expected to be requested by a user. The server software module responds to such a request by retrieving the cached document and forwarding the retrieved cache document to the user.

BRIEF DESCRIPTION OF THE DRAWINGS

The foregoing summary, as well as the following detailed description of the embodiments of the present invention, will be better understood when read in conjunction with the appended drawings. For the purpose of illustrating the invention, there are shown in the drawings embodiments which are presently preferred. As should be understood, however, the invention is not limited to the precise arrangements and instrumentalities shown. In the drawings.

DETAILED DESCRIPTION OF THE INVENTION

Computer Environment

Figure 1:
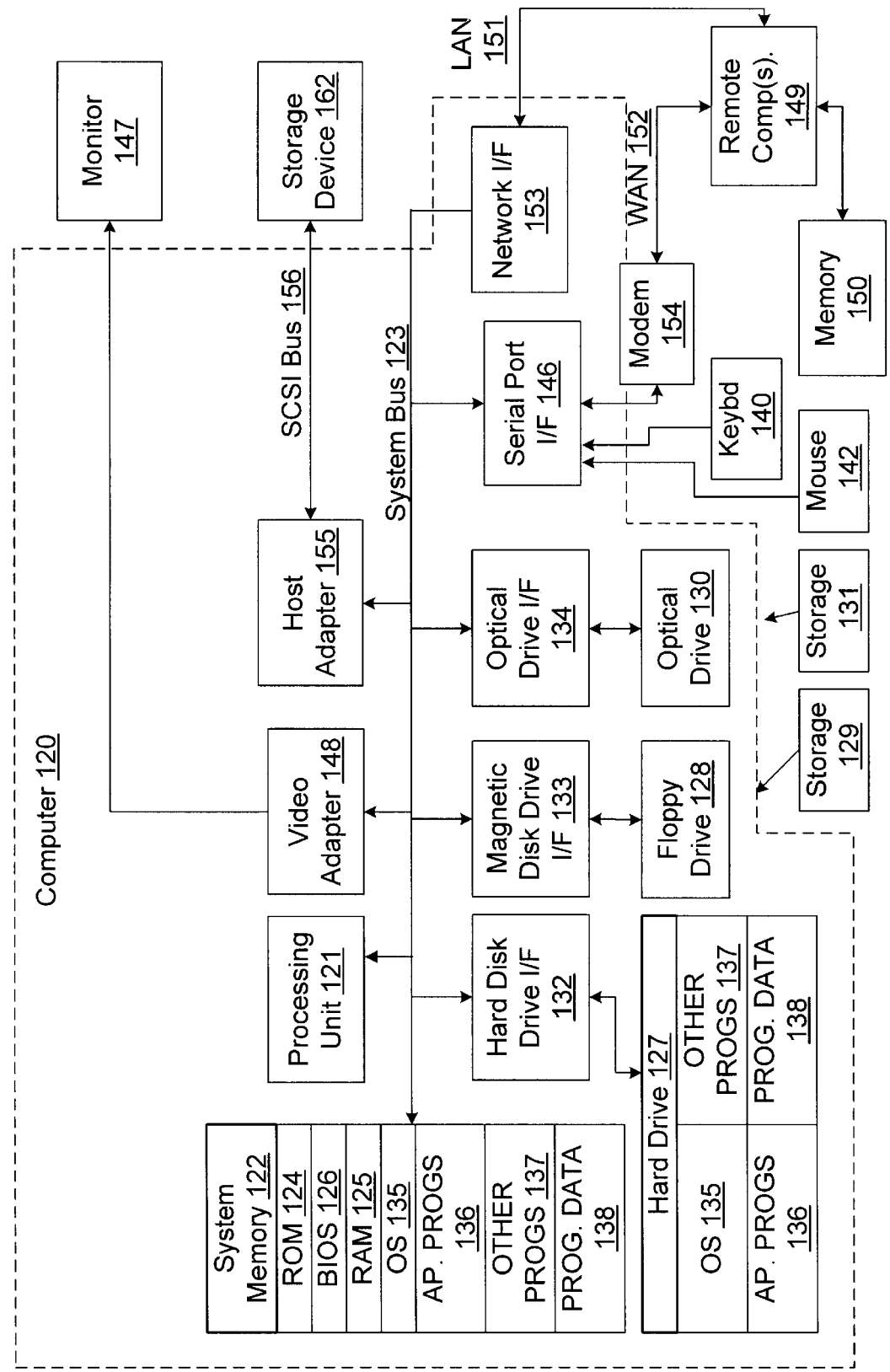
FIG. 1 is a block diagram representing a general purpose computer system in which aspects of the present invention and/or portions thereof may be, incorporated.

FIG. 1 and the following discussion are intended to provide a brief general description of a suitable computing environment in which the ,present invention and/or portions thereof may be implemented. Although not required, the invention is described in the general context of computer-executable instructions, such as program modules, being executed by a computer, such as a client workstation or a server. Generally, program modules include routines, programs, objects components, data structures and the like that perform particular tasks or implement particular abstract data types. Moreover, it should be appreciated that the invention and/or portions thereof may be practiced with other computer system configurations, including hand-held devices, multi-processor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 120 or the like, including a processing unit 121 a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the personal computer 120, such as during start-up, is stored in ROM 124.

The personal computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the personal computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include a magnetic cassette, a flash memory card, a digital video disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the personal computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a personal computer typically includes other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The personal computer 120 may operate in a networked environment using logical connections to one or more remote computers, such as a remote computer 149. The remote computer 149 may be another personal computer, a server, a router, a network PC, a peer device or other common network node, and typically includes many or all of the elements described above relative to the personal computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide, computer networks, intranets, and the Internet.

When used in a LAN networking environment, the personal computer 120 is connected to the LAN 151 through a network interface or adapter 153. When used in a WAN networking environment, the personal computer 120 typically includes a modem 154 or other means for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It will be appreciated that the network connections shown are exemplary and other means of establishing a communications link between the computers may be used.

System and Method of the Present Invention

Figure 2:
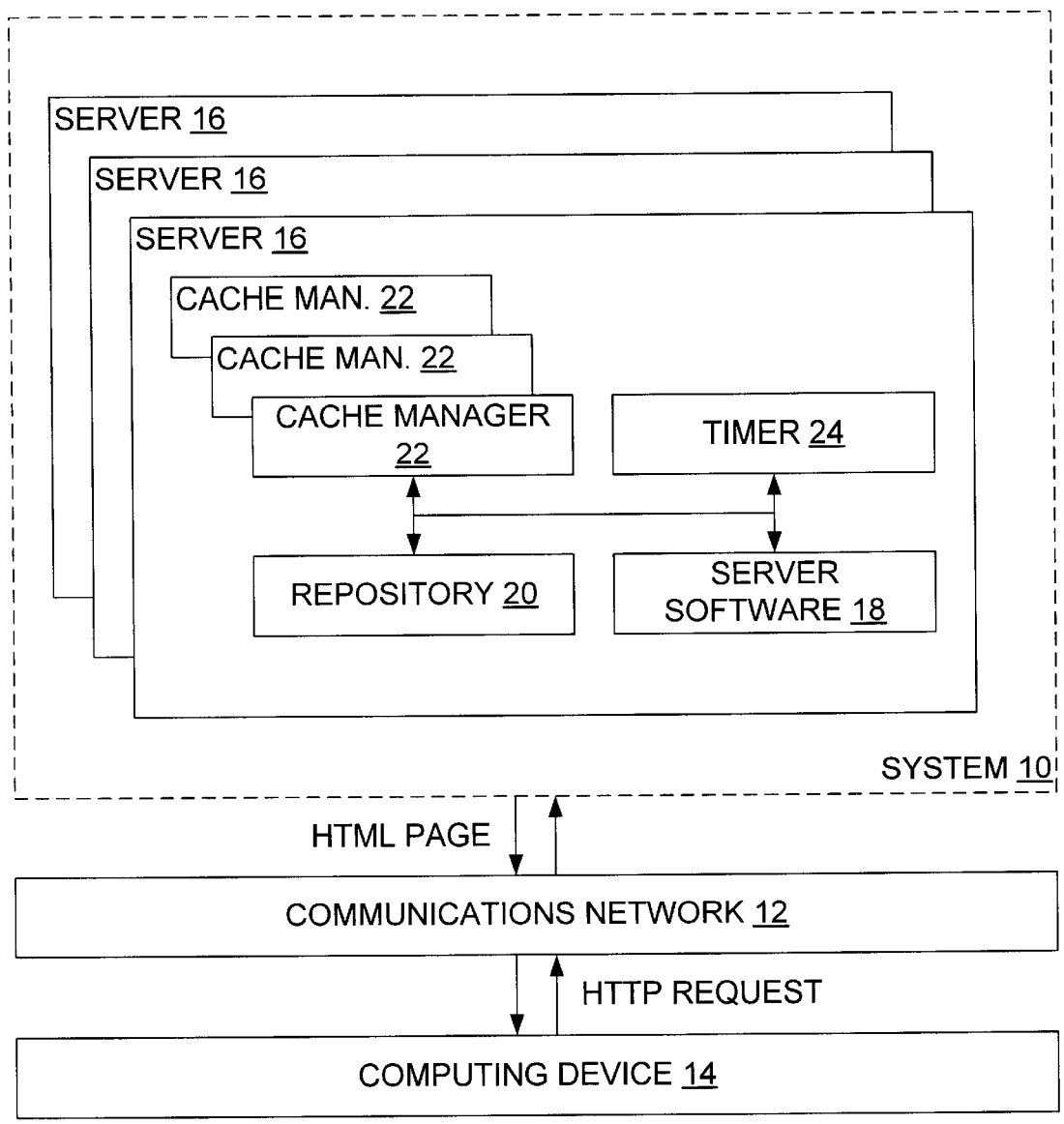
FIG. 2 is a block diagram showing a system for caching and retrieving information in accordance with one embodiment of the present invention.

Referring to the drawings in details, wherein like numerals are used to indicate like elements throughout, there is shown in FIG. 2 a system 10 for caching and retrieving information in accordance with one embodiment of the present invention. As shown, the system 10 is coupled to a communications network 12 such as the Internet for receiving an information request from a user at a computing device 14, and for sending the requested information to the user at the computing device 14. The computing device 14 and the link between the computing device 14 and the network 12 may be any appropriate computing device 14 and link without departing from the spirit and scope of the present invention. For example, the computing device 14 may be the aforementioned personal computer 120 of FIG. 1 a handheld computer, or the like, and the link may be a wired link such as the aforementioned LAN 151, WAN 152, or modem 154 of FIG. 1, a wireless link, such as an IR or RF link, or the like. In any case, the computing device 14 has appropriate software for implementing the connection with the system 10 through the network 12 and for sending requests and receiving and displaying information. Such software may for example include a browser, although other types of software may be employed without departing from the spirit and scope of the present invention.

In one embodiment of the present invention, the system 10 includes an appropriately configured server 16 or the like. Any particular server 16 may be employed without departing from the spirit and scope of the present invention. If the volume of incoming requests warrants, the system 10 may run on a plurality of parallel servers 16 or the like, where each server 16 is configured to handle incoming requests.

As seen in FIG. 2, each server 16 includes server software 18 running thereon for performing all necessary server functions. Such server software 18 may be any appropriate software and may function in any particular manner without departing from the spirit and scope of the present invention. Server software 18 and the function thereof are known or should be apparent to the relevant public and therefore need not be described herein in any detail.

The server 16 also includes an information repository 20 for receiving and storing information that is to be served by the server. As may be appreciated, the information repository 20 is provided with all information necessary to construct a page in response to a request therefor. Such information repository 20 may be embodied in the form of a storage device or a portion thereof, although such information repository 20 may be embodied in any other form without departing from the spirit and scope of the present invention. The information in the information repository 20 may be any appropriate information without departing from the spirit and scope of the present invention, and can include news articles, advertisements, weather information, sports information, map information, telephone directories, financial information, and/or the like; and/or site identifiers or other link information for linking to such information.

Preferably, such information in the information repository 20 is updated from external sources (not shown) on a timely and/or regular basis, which may be on the order of every 15 seconds, every 15 minutes, or the like, depending on the type of information and other factors.

Figure 3:
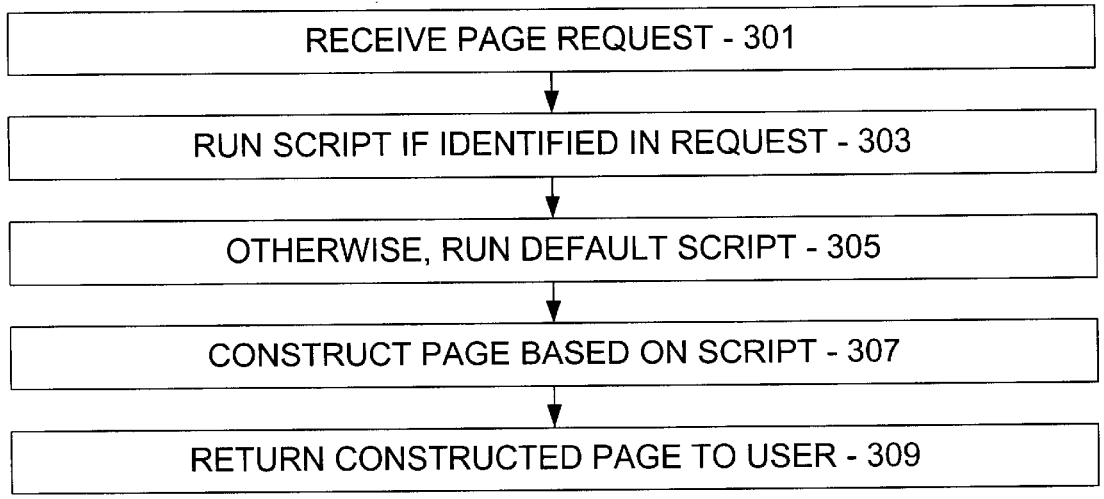
FIG. 3 is a flow diagram showing typical steps typically performed to render information in response to a user request therefor.

In a typical situation, and referring now to FIG. 3, a user at a computing device 14 causes the computing device 14 to appropriately couple to the network 12, and initiates a page request for a page from the server 16 by way of the network 12, perhaps by way of browser software running on the computing device 14. The page request may for example be initiated by selecting a link on an HTML page, where the link references a site identifier such as a predefined resource locator such as a Universal Resource Locator (URL) for the server 16, or by typing such site identifier, or by having such site identifier designated as the default/home identifier for the browser software. The page request 18 may be in the form of an HTTP request or in another form without departing from the spirit and scope of the present invention.

The server 16 and the server software 18 thereon receive the page request (step. 301), and in response thereto construct the requested page. Typically, such page is constructed according to a script that defines the information to be included in the page, the organization of such information, other related matters, and any housekeeping and/or accounting functions that are to be performed. The script to be employed may be defined by the page request, by the server 16 and/or the server software 18, or by default if no script is specified elsewhere.

Accordingly, the server software 18 looks to the received page request for any identified script that is to be run in the course of constructing the page (step 303). Such script may for example be identified in a script field in the page request, or may be identified elsewhere without departing from the spirit and scope of the present invention. If no such script is found such server software 18 may run a default script (step 305).

A sample outline of a default script is as follows:
1. Do business logic, accounting, housekeeping, etc.;
2. Render any header information (advertising, etc.) according to information in repository 20;
3. Render main body of page according to information in repository 20;
4. Render any footer information (advertising, etc.) according to information in repository 20.

Of course, any appropriate script may be employed without departing from the, spirit and scope of the present invention. Such scripts and the drafting thereof are known or should be apparent to the relevant public and therefore need not be described herein in any detail.

Based on the script that is run, then, the server 16 and the server software 18 thereon construct the page (step 307). Such page may be constructed to be in a format such as an HTML format or another format acceptable to the browser on the computing device 14 of the requesting user. Once constructed, the page (HTML or otherwise) is returned to and received at the computing device 14 of the requesting user (step 309). The browser on such computing device 14 thus renders the received page to display the information to the user.

As was discussed above, because the information in the repository 20 may have been updated since a previous request was serviced, the server 16 and server software 18 thereon preferably newly construct the requested page for each and every received request in order that the constructed page has the latest, newest, and/or most current information. However, if the page is served by the server many times before information therein is updated, the process becomes inefficient in that the exact same page is being constructed multiple times. Accordingly, in one embodiment of the present invention, the page is cached on a regular basis by a cache manager 22, as is seen in FIG. 2. Preferably, at least the cached document is stored in the same work space as (i.e., 'along side') the server software 18. Accordingly, the cached document is directly accessible to the server software 18. In the case where the cache manager 22 stores the cached document in its own work space, it is preferable to have the cache manager 22 in the same work space as the server software 18.

The cache manager 22 either stores the cached page in the repository 20 or in another storage location. The cache manager 22 may operate in a manner akin to the server software 18 in the course of preparing and caching the page on a regular and/or timely basis. However, since the server software 18 already exists and is already used to prepare a page, in one embodiment of the present invention, the cache manager 22 acts like a pseudo-user and initiates a page request from within the server for a page from the server 16. As with a real user page request, the pseudo-page request from the cache manager 22 is in the form of an HTTP request, although it is to be appreciated that the request need not be routed to the server software 18 by way of the network 12.

Figure 4:
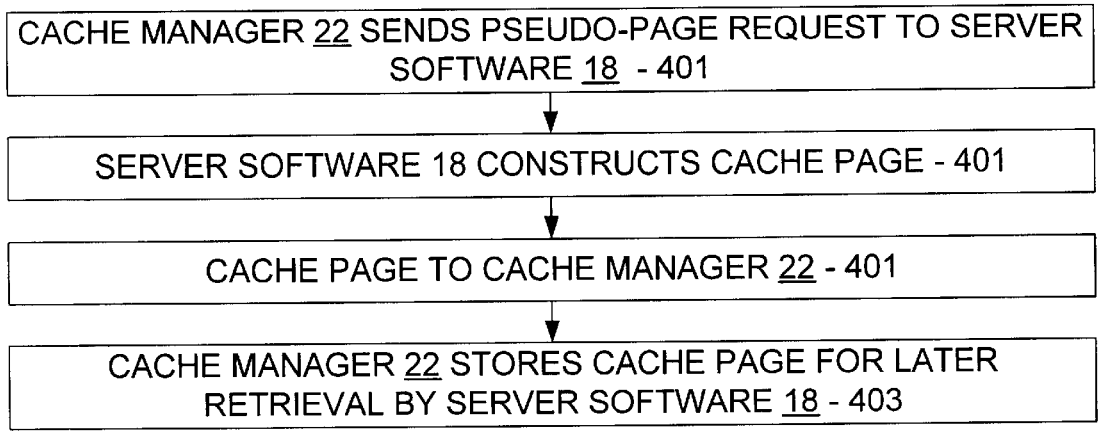
FIG. 4 is a flow diagram showing steps performed by the cache manager in the system of FIG. 2 in accordance with one embodiment of the present invention.

In one embodiment of the present invention, and referring now to FIG. 4, the cache manager 22 requests in the pseudo-HTTP page request that the server software 18 prepare the to-be-cached page according to a pre-determined cache script similar to the default script above (step 401). As was discussed above, the cache script to be employed by the server software 18 may be identified in a script field in the pseudo-page request, or elsewhere. Generally, in a cache script, the main body of the requested page is rendered by the server software 18 according to information currently in the repository 20.

Such cache script need not do any business logic or render any header or footer information. However, such items may be undertaken in the cache script without departing from the spirit and scope of the present invention. As will be seen below, such items may also be undertaken by the server software 18 in response to a user request. Of course, any appropriate cache script may be employed without departing from the spirit and scope of the present invention. Such cache scripts and the drafting thereof should be apparent to the relevant public and therefore need not be described herein in any detail.

Based on the cache script that is run by the server software 18 in response to a pseudo-page request from a cache manager 22, then, and referring now to FIG. 4, the server software 18 on the server 16 constructs the cache page (step 403), and then returns the cache page to the cache manager 22 (step 405). As should now be appreciated, the cache manager 22 stores the cache page (step 407) for later retrieval by the server software 18, as will be discussed below. As with a page constructed according to the above default script, the cached page may be constructed to be in a format such as an HTML format or another format acceptable to the browser on the computing device 14 of a requesting user.

In one embodiment of the present invention, the cache manager 22 operates based on a timer 24 to periodically send the pseudo-page request to the server software 18 and thereafter cache the received page. The timer 24 is preferably instantiated on the server 16in the same work space as the cache manager 22, although such timer 24 may be instantiated elsewhere or may be a hardware device operatively coupled to the cache manager 22. Preferably, the cache period is short enough to ensure that information embodied in the cached page does not become 'stale', but long enough so that caching does not occur too frequently. For example, where at least a portion of the information can be expected to change every 15 seconds (stock quotes, e.g.), the cache period may be about 3 seconds. Of course, other cache periods may be employed without departing from the spirit and scope of the present invention.

With such a cached page, the operation of the server software 18 on the server 16 as discussed in connection with FIG. 3 must be altered to retrieve the cached page rather than to newly construct a page. In particular, and referring now to FIG. 5, in one embodiment of the present invention in response to a page request as received from a user (i.e. not a pseudo-request as received from a cache manager 22) (step 501), the server software 18 runs a default (cache) script (step 503). As seen below, such default (cache) script is similar to but slightly different from the default script outlined above.

A sample outline of such a default (cache) script is as follows:

1. Do business logic, accounting, housekeeping, etc.;
2. Render any header information (advertising, etc.) according to information in repository 20;
3. Retrieve cached page as stored by the cache manager 22 from cached page storage location (step 505);
4. Render any footer information (advertising, etc.) according to information in repository 20.

Of course, any appropriate default (cache) script may be employed without departing from the spirit and scope of the present invention. Once again, such scripts and the drafting thereof are known or should be apparent to the relevant public and therefore need not be described herein in any detail.

Based on the default (cache) script that is run, then, the server 16 and the server software 18 thereon construct a page ('the super-page') which includes the cached page along with header and footer information (step 507). Of course, such header and/or footer information may be omitted without departing from the spirit and scope of the present invention. Additionally, other information may be added without departing from the spirit and scope of the present invention. Once again, such super-page including the cached page may be constructed to be in a format such as an HTML format or another format acceptable to the browser on the computing device 14 of the requesting user. Once constructed, the super-page (HTML or otherwise) is returned to and received at the computing device 14 of the requesting user (step 509). The browser on such computing device 14 thus renders the received super-page to display the information to the user.

As was pointed out above, in some situations the server 16 and server software 18 thereon is expected to construct different variations of a requested page depending on who the user is and/or what hardware and/or software the user is employing in connection with the computing device thereof, among other things. For one example, the user may have already personalized the information that is to appear in the constructed page based on the users geographic location, or based on options pre-selected by the user, where such personalized information is specified in a 'cookie' or the like sent with the page request. For another example, the user may be employing a computing device 14 having a particular browser that is specified in a user agent string or the, like sent with the page request.

In such a situation, the server 16 should be expected to serve a multitude of variations of the requested page, especially when it is considered that there are a multitude of different ways the user may have already personalized the information that is to appear in the constructed page as represented by the cookie, and a multitude of ways that the computing device 14 may vary as represented by the user agent string. As should be appreciated, each of the multitude of variations of the requested page may be served by way of a plurality of cache managers 22 that are constructed and operated on the server 16, where each particular cache manager 22 requests a particular variation of the page from the server software 18 and then stores the returned cache page.

Of course, such an approach is likely to be untenable, given that the actual number of variations and therefore cache managers 22 based on even a relatively simple served page could easily approach hundreds, and on a more complex served page could easily approach millions. Moreover, and at any rate, the cached pages produced by the vast majority of such cache managers 22 would likely be employed so infrequently as to result in the performed caching being less efficient than having the server software 18 render the requested page 'on the fly'.

Nevertheless, there are at least some variations of the served page that are, constructed frequently enough to merit caching. For example, if many pages are requested based on a particular postal code and based on a particular browser type, it may be more efficient to cache such a variation. Accordingly, in one embodiment of the present invention, such 'efficient' variations are identified. Each efficient variation is then 'bucketed' by creation and operation of an appropriate corresponding cache manager 22 that requests such variation from the server software and caches such variation on a regular basis according to an appropriate cache variation script in the manner discussed above in connection with FIG. 4.

Figure 5:
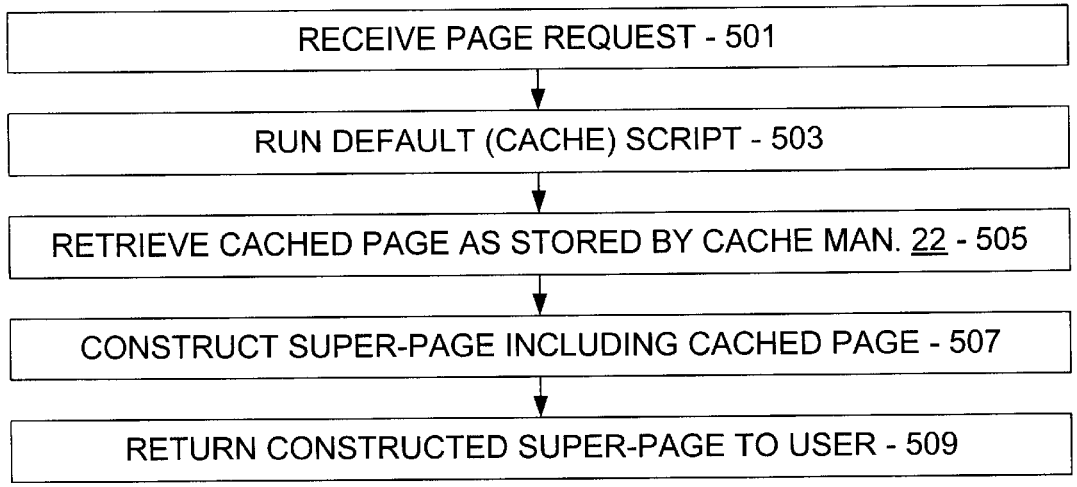
FIG. 5 is a flow diagram showing steps performed to render information in response to a user request therefor and in connection with the cache manager in the system of FIG. 2 in accordance with one embodiment of the present invention.
Figure 6:
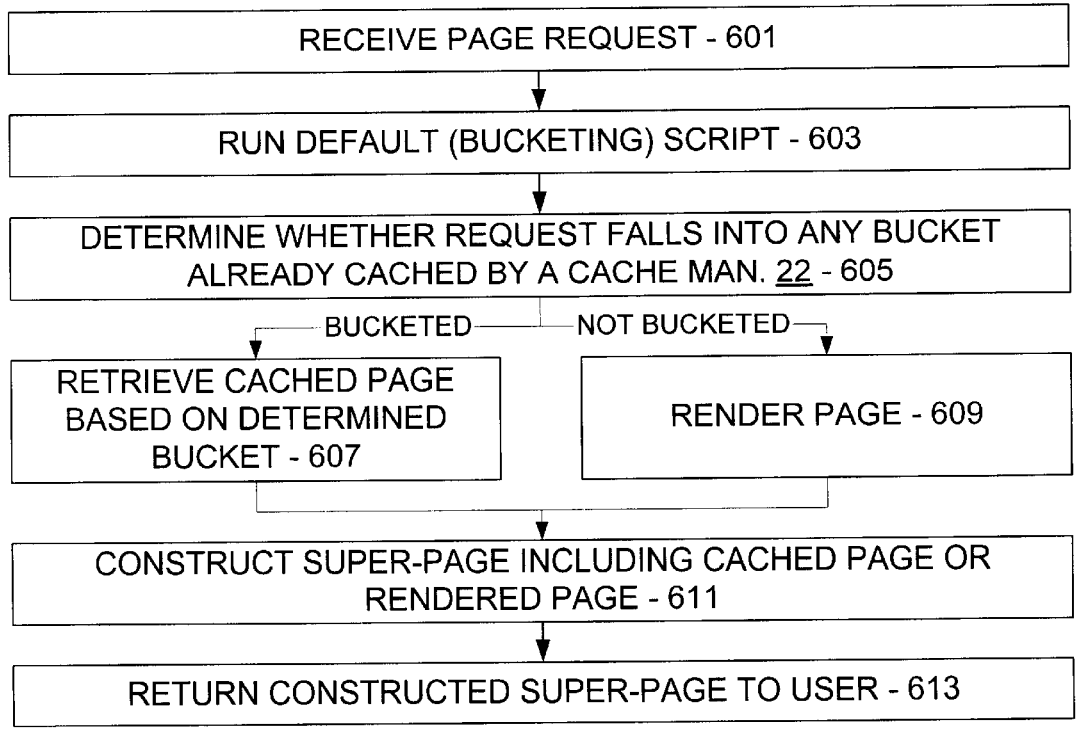
FIG. 6 is a flow diagram showing steps performed to render multiple variations of information in response to a user request therefor and in connection with corresponding cache managers in the system of FIG. 2 in accordance with one embodiment of the present invention.

With such cached bucketed pages, then, the operation of the server software 18 on the server 16 as discussed in connection with FIG. 5 must be altered to either retrieve the correct cached bucketed page or to newly construct a variation of a page if no cached bucketed page exists for such variation. In particular, and referring now to FIG. 6, in one embodiment of the present invention, in response to a page request as received from a user (step 601), the server software 18 runs a default (bucketing) script (step 603). As seen below, such default (bucketing) script is similar to but slightly different from the default script outlined above.

A sample outline of such a default (bucketing) script is as follows:

1. Do business logic, accounting, housekeeping, etc.;
2. Determine from cookie arid/or user agent if page request falls into any 'bucket' that is already cached by an appropriate cache manager 22 (step 605);

IF SO:

3. Render any header information (advertising, etc.) according to information in repository 20;
4. Retrieve, based on the determined bucket, the appropriate cached page as produced by the appropriate cache manager 22 from cached page storage location (step 607);
5. Render any footer information (advertising, etc.) according to information in repository 20.

IF NOT:

3. Render any header information (advertising, etc.) according to information in repository 20;
4. Render main body of page according to information in repository 20 (step 609);
5. Render any footer information (advertising, etc.) according to information in repository 20.

Of course, any appropriate default (bucketing) script may be employed without departing from the spirit and scope of the present invention. Once again, such scripts and the drafting thereof are known or should be apparent to the relevant public and therefore need not be described herein in any detail.

Based on the default (bucketing) script that is run, then, the server 16 and the server software 18 thereon construct a page ('the super-page') which includes the cached page or the newly rendered page along with header and footer information (step 611). Of course, such header and/or footer information may be omitted without departing from the spirit and scope of the present invention. Additionally, other information may be added without departing from the spirit and scope of the present invention. Once again, such super-page including the cached page may be constructed to be in a format such as an HTML format or another format acceptable to the browser on the computing device 14 of the requesting user. Once constructed, the super-page (HTML or otherwise) is returned to and received at the computing device 14 of the requesting user (step 613). The browser on such computing device 14 thus renders the received super-page to display the information to the user.

In an alternative embodiment of the present invention, in addition to or as an alternative to header and footer information, the super-page includes mid-page information. In such a case, an upper portion cache manager 22 may be employed to request and store a cached upper page and a lower upper portion cache manager 22 may be employed to request and store a cached lower page. Thus, a default (cache (upper and lower)) script would retrieve the cached upper page as stored by the upper portion cache manager 22, render the mid-page information (advertising, etc.) according to information in repository 20, and then retrieve the cached lower page as stored by the lower portion cache manager 22. Of course additional distinct mid-page pieces of information could be accommodated in a similar manner through the use of additional cache managers 22.

In a variation on the alternative embodiment discussed immediately above, the cached upper page and cached lower page, and perhaps additional, mid-page pieces of information, may be selected based on a determination from a received cookie and/or user agent that a page request falls into a particular bucket. Here, though, the bucket is not supplied by a particular cache manager 22, but instead by several cache managers 22 which each provide portions of the requested page.

Conclusion

The programming necessary to effectuate the processes performed in connection with the present invention is relatively straight-forward and should be apparent to the relevant programming public. Accordingly, such programming is not attached hereto. Any particular programming, then, may be employed to effectuate the present invention without departing from the spirit and scope thereof.

In the foregoing description, it can be seen that the present invention comprises a new and useful system and method for caching and retrieving information and/or multiple variations of such information to more efficiently respond to requests for such information, while at the same time ensuring that the information is current. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A system for caching and retrieving information comprising a server having:
   an information repository for receiving and storing data that is to be employed to construct a document to be served by the server, such data being regularly updated from at least one external source;
   a server software module performing server functions including responding to at least some requests for the document from a requestor by retrieving the data currently stored in the repository, rendering the document to include the retrieved data, and forwarding the rendered document to the requester; and
   a plurality of cache managers each requesting a variation of the document from the server software module, receiving the requested variation of the document as rendered by the server software module to include the retrieved data currently stored in the repository, and caching the received variation of the document on a regular basis, each cached variation of the document as produced by a particular cache manager differing from other cached variations of the document as produced by other cache managers, each cached variation of the document being tailored to satisfy a request for the document by a particular type of user; and
   the server software module responding to a request for the document from a user by determining what particular type the user is, retrieving the corresponding cached variation of the document, and forwarding the retrieved cached variation of the document to the user.

2. The system of claim 1 further comprising a timer providing timing upon which the cache manager caches the document on the regular basis.

3. The system of claim 2 wherein the server has multiple work spaces and the server software module and cached document reside in a common work space.

4. The system of claim 1 wherein the server has multiple work spaces and the server software module and cached document reside in a common work space.

5. The system of claim 1 wherein the cache manager stores the cached document in the repository and the server software module retrieves the cached document from the repository.

6. The system of claim 1 wherein in caching the document including the retrieved data on a regular basis, each new cached document replaces a previous cached document.

7. The system of claim 1 wherein:
   the cache manager requests that the document be rendered by the server software module according to a cache script; and
   the server software module responding to a request for the cached document from the user according to a server software module script.

8. The system of claim 7 wherein the cache document rendered according to the cache script represents a main portion of information to be forwarded to the user, and the server software module renders additional information to be forwarded to the user according to the server software module script.

9. The system of claim 8 wherein the server software module forwards the main portion of information and the additional information to the user in the form of an HTML page.

10. The system of claim 9 wherein the additional information includes one of: header information in the HTML page, footer information in the HTML page, and a combination thereof.

11. A method of caching and retrieving information to be served by a server comprising:
    the server receiving and storing data that is to be employed to construct a document to be served by the server, such data being regularly updated from at least one external source;
    the server on a regular basis:
        retrieving the data currently stored; and
        rendering and caching a plurality of variations of the document including the retrieved data on a regular basis, each cached variation of the document differing from other cached variations of the document, each cached variation of the document being tailored to satisfy a request for the document by a particular type of user; and
    the server responding to a request for the document from a user by:
        determining what particular type the user is;
        retrieving the corresponding cached variation of the document; and
        forwarding the retrieved cached variation of the document to the user.

12. The method of claim 11 comprising caching the rendered document in a repository and retrieving the cached document from the repository.

13. The method of claim 11 wherein caching the document on a regular basis comprises replacing a previously cached document with a newly cached document.

14. The method of claim 11 comprising:
    retrieving and rendering according to a cache script, the cache script being run on a regular basis; and
    retrieving and forwarding according to a server software module script, the server software module script being run in response to the user request.

15. The method of claim 14 comprising rendering the document to form a main portion of information to be forwarded to the user, and further comprising rendering additional information to be forwarded to the user after retrieving the cached document.

16. The method of claim 15 comprising rendering the document and rendering the additional information in the form of an HTML page.

17. The method of claim 16 comprising rendering the additional information as one of header information, footer information, and a combination thereof.

18. A computer-readable medium having computer-executable instructions thereon for implementing a method of caching and retrieving information to be served by a server, the instructions comprising modules including:
    a first module for receiving and storing data, by the server, that is to be employed to construct a document to be served by the server, such data being regularly updated from at least one external source;
    a second module operated on a regular basis, by the server, to:
        retrieving the data currently stored; and
        rendering a document including the retrieved data;
    a plurality of third modules, each third module caching a variation of the document including the retrieved data on a regular basis, each cached variation of the document differing from other cached variations of the document, each cached variation of the document being tailored to satisfy a request for the document by a particular type of user;
    the second module responding to a request for the document from a user by:

determining what particular type the user is;
retrieving the corresponding cached variation of the document; and
forwarding the retrieved cached variation of the document to the user.

19. The medium of claim 18 wherein the third module caches the rendered document in a repository and the second module retrieves the cached document from the repository.

20. The medium of claim 18 wherein the third module in caching the document on a regular basis replaces a previously cached document with a newly cached document.

21. The medium of claim 18 wherein:
the second module retrieves and renders according to a cache script, the cache script being run on a regular basis; and
the second module retrieves and forwards according to a server software module script, the server software module script being run in response to the user request.

22. The medium of claim 21 wherein the second module renders the document to form a main portion of information to be forwarded to the user, and the second module renders additional information to be forwarded to the user after retrieving the cached document.

23. The medium of claim 22 wherein the second module renders the document and the additional information in the form of an HTML page.

24. The medium of claim 23 wherein the second module renders the additional information as one of header information, footer information, and a combination thereof.

25. A method of serving information from a server comprising:
the server receiving an information request from a user at a computing device remote from the server;
the server constructing a document at the server including the requested information; and
the server returning the constructed document including the requested information to the requesting user at the computing device;
wherein a plurality of variations of a main portion of the document are rendered and cached by the server on a regular basis, each cached variation of the main portion of the document differing from other cached variations of the main portion of the document, each cached variation being tailored to satisfy a request for the document by a particular type of user, and wherein constructing the document comprises:
determining what particular type the user is; and
determining whether the particular type corresponds to any of the cached variations;
if so, retrieving, based on the particular type of the user, the appropriate cached variation and constructing the document based thereon; and
if not, rendering the appropriate variation and constructing the document based thereon.

26. The method of claim 25 wherein constructing the document comprises:
rendering any header material to be included in the document;
retrieving a cached main portion of the document including the requested information;
inserting the cached main portion within the document; and
rendering any footer material to be included in the document.

27. The method of claim 26 wherein constructing the document comprises:

rendering any header material to be included in the document;
retrieving a first cached main portion of the document including the requested information;
inserting the first cached main portion within the document;
retrieving a second cached main portion of the document including the requested information;
inserting the second cached main portion within the document; and
rendering any footer material to be included in the document.

28. The method of claim 27 wherein constructing the document comprises:
rendering any header material to be included in the document;
retrieving an upper cached main portion of the document including the requested information;
inserting the upper cached main portion within the document;
rendering mid-document material to be included after the upper cached main portion within the document;
retrieving a lower cached main portion of the document including the requested information;
inserting the lower cached main portion within the document after the mid-document material; and
rendering any footer material to be included in the document.

29. A computer-readable medium having computer-executable instructions thereon for implementing a method of serving information from a server, the instructions comprising modules including:
a first module for receiving an information request, by the server, from a user at a computing device remote from the server;
a second module for constructing a document, by the server, at the server including the requested information; and
a third module for returning the constructed document, by the server, including the requested information to the requesting user at the computing device;
wherein the second module comprises:
a plurality of first sub-modules, each first sub-module rendering and caching a main portion of the document on a regular basis, each cached variation of the main portion of the document differing from other cached variations of the main portion of the document, each cached variation being tailored to satisfy a request for the document by a particular type of user; and
a second sub-module for constructing the document, the second sub-module comprising:
a first sub-sub-module for determining what particular type the user is;
a second sub-sub module for determining whether the particular type corresponds to any of the cached variations;
a third sub-sub-module for retrieving, based on the particular type of the user, the appropriate cached variation and constructing the document based thereon, if the particular type corresponds to any of the cached variations; and
a fourth sub-sub-module for rendering the appropriate variation and constructing the document based thereon if the particular type does not correspond to any of the cached variations.

30. The medium of claim 29 wherein the second module constructing the document comprises:
- a first sub-module for rendering any header material to be included in the document;
- a second sub-module for retrieving a cached main portion of the document including the requested information;
- a third sub-module for inserting the cached main portion within the document; and
- a fourth sub-module for rendering any footer material to be included in the document.

31. The medium of claim 30 wherein the second module constructing the document comprises:
- a first sub-module for rendering any header material to be included in the document;
- a second sub-module for retrieving a first cached main portion of the document including the requested information;
- a third sub-module for inserting the first cached main portion within the document;
- a fourth sub-module for retrieving a second cached main portion of the document including the requested information;
- a fifth sub-module for inserting the second cached main portion within the document; and
- a sixth sub-module for rendering any footer material to be included in the document.

32. The medium of claim 31 wherein the second module constructing the document comprises:
- a sub-module for rendering any header material to be included in the document;
- a first sub-module for retrieving an upper cached main portion of the document including the requested information;
- a second sub-module for inserting the upper cached main portion within the document;
- a third sub-module for rendering mid-document material to be included after the upper cached main portion within the document;
- a fourth sub-module for retrieving a lower cached main portion of the document including the requested information;
- a fifth sub-module for inserting the lower cached main portion within the document after the mid-document material; and
- a sixth sub-module for rendering any footer material to be included in the document.

* * * * *